US008380132B2

(12) United States Patent
Nagy

(10) Patent No.: US 8,380,132 B2
(45) Date of Patent: *Feb. 19, 2013

(54) SELF-STRUCTURING ANTENNA WITH ADDRESSABLE SWITCH CONTROLLER

(75) Inventor: Louis L. Nagy, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 1844 days.

This patent is subject to a terminal disclaimer.

(21) Appl. No.: 11/226,872

(22) Filed: Sep. 14, 2005

(65) Prior Publication Data

US 2007/0060201 A1 Mar. 15, 2007

(51) Int. Cl.
*H04B 1/00* (2006.01)
*H04B 15/00* (2006.01)

(52) U.S. Cl. ........ 455/63.4; 455/78; 455/562.1; 455/69; 455/25; 455/575.7; 455/277.1; 342/359; 342/374; 343/768; 343/810; 343/909

(58) Field of Classification Search ............... 455/562.1, 455/575.7, 63.4, 78, 69, 277.1, 277.2, 25, 455/63.3; 343/768, 909, 754, 767, 756, 700 MS, 343/872, 792
See application file for complete search history.

(56) References Cited

U.S. PATENT DOCUMENTS 4,220,954 A * 9/1980 Marchand ..................... 342/433
4,359,740 A * 11/1982 Frazita ......................... 343/703
4,376,281 A * 3/1983 Smith ........................... 343/768
4,811,032 A * 3/1989 Boksberger et al. .......... 343/876
5,248,984 A * 9/1993 Sezai ............................ 342/427
5,502,453 A 3/1996 Tsukamoto et al.
5,579,024 A 11/1996 Sureau
5,621,423 A 4/1997 Sureau
5,675,343 A * 10/1997 Champeau .................... 342/378
5,752,200 A 5/1998 Meredith et al.
5,754,143 A * 5/1998 Warnagiris et al. ........... 343/767
5,767,807 A * 6/1998 Pritchett ....................... 342/374
5,877,726 A * 3/1999 Kudoh et al. .......... 343/700 MS
5,911,116 A * 6/1999 Nosswitz ........................ 455/83
6,018,651 A * 1/2000 Bruckert et al. ........... 455/277.1

(Continued)

FOREIGN PATENT DOCUMENTS

EP 0539297 4/1993
EP 1120856 8/2001

(Continued)

OTHER PUBLICATIONS

R.C. Johnson, "Antenna Engineering Handbook", Third Edition, Fundamentals of Antennas, Henry Jasic, Chpt. 2, pp. 1-3; Slot Antennas; Croswell, et al.; Chpt. 8, pp. 1-18; Slot-Antenna Arrays, Yee, et al., pp. 1-37; Frequency-Independent Antennas, DuHamel, et al., Chpt. 14, pp. 1-10.

(Continued)

*Primary Examiner* — Marceau Milord
(74) *Attorney, Agent, or Firm* — J. Gordon Lewis

(57) ABSTRACT

A self-structuring antenna system comprises a plurality of antenna elements, a plurality of switch elements arranged with the antenna elements to, when selectively closed, electrically couple ones of the antenna elements to one another, and a switch controller for opening and closing the switch elements. The switch controller is operatively associated with the plurality of switch elements via a plurality of addressable switch controllers.

8 Claims, 2 Drawing Sheets

U.S. PATENT DOCUMENTS

| | | | | |
|---|---|---|---|---|
| 6,023,615 | A * | 2/2000 | Bruckert et al. | 348/14.08 |
| 6,061,025 | A * | 5/2000 | Jackson et al. | 343/700 MS |
| 6,075,485 | A | 6/2000 | Lilly et al. | |
| 6,163,296 | A * | 12/2000 | Lier et al. | 342/417 |
| 6,175,723 | B1 * | 1/2001 | Rothwell, III | 455/63.1 |
| 6,208,316 | B1 | 3/2001 | Cahill | |
| 6,212,242 | B1 * | 4/2001 | Smith et al. | 375/299 |
| 6,363,263 | B1 * | 3/2002 | Reudink et al. | 455/562.1 |
| 6,396,449 | B1 | 5/2002 | Osterhues et al. | |
| 6,396,451 | B1 | 5/2002 | Wu et al. | |
| 6,417,807 | B1 | 7/2002 | Hsu et al. | |
| 6,512,494 | B1 | 1/2003 | Diaz et al. | |
| 6,525,695 | B2 | 2/2003 | McKinzie, III | |
| 6,608,607 | B2 * | 8/2003 | Wu | 343/909 |
| 6,700,542 | B2 * | 3/2004 | Borlez et al. | 343/700 MS |
| 6,714,771 | B1 | 3/2004 | Nagy et al. | |
| 6,842,609 | B2 | 1/2005 | Davis et al. | |
| 6,856,297 | B1 * | 2/2005 | Durham et al. | 343/795 |
| 6,865,402 | B1 | 3/2005 | Gilbert | |
| 6,876,336 | B2 * | 4/2005 | Croswell et al. | 343/795 |
| 6,889,061 | B2 * | 5/2005 | Shapira et al. | 455/562.1 |
| 6,891,516 | B1 * | 5/2005 | Saunders et al. | 343/895 |
| 6,912,406 | B2 * | 6/2005 | Lahlum et al. | 455/553.1 |
| 6,917,793 | B2 * | 7/2005 | Wang | 455/193.1 |
| 6,950,629 | B2 * | 9/2005 | Nagy | 455/63.4 |
| 7,009,570 | B2 * | 3/2006 | Durham et al. | 343/753 |
| 7,129,892 | B2 * | 10/2006 | Borlez et al. | 343/700 MS |
| 7,190,325 | B2 * | 3/2007 | Nagy | 343/909 |
| 7,245,269 | B2 * | 7/2007 | Sievenpiper et al. | 343/909 |
| 7,253,699 | B2 * | 8/2007 | Schaffner et al. | 333/32 |
| 7,298,228 | B2 * | 11/2007 | Sievenpiper | 333/101 |
| 2002/0036718 | A1 | 3/2002 | Lee | |
| 2002/0167457 | A1 | 11/2002 | McKinzie, III et al. | |
| 2003/0100333 | A1 | 5/2003 | Standke et al. | |
| 2003/0103011 | A1 | 6/2003 | Rogers et al. | |
| 2003/0219035 | A1 | 11/2003 | Schmidt | |
| 2003/0228857 | A1 * | 12/2003 | Maeki | 455/278.1 |
| 2005/0012677 | A1 | 1/2005 | Brown et al. | |

FOREIGN PATENT DOCUMENTS

| | | |
|---|---|---|
| GB | 2335798 | 9/1999 |

OTHER PUBLICATIONS

J.D. Kraus, “Antennas”, Second Edition, pp. 624-627 and 632-635.

General Motors R&D Center “Search”, vol. 31, No. 1, Jul. 1997, pp. 1-6.

PCT Search Report dated Jun. 25, 2008.

European Search Report dated Sep. 28, 2009.

C.M. Coleman et al., “Application of Two-Level Evolutionary Algorithms to Self-Structuring Antennas,” 2001 URSI National Radio Science Meeting, Boston, MA, Jul. 2001.

C.M. Coleman et al., Self-structuring antennas, IEEE Antennas and Propagation Magazine, vol. 44(3), p. 11-23, Jun. 2002.

C.M. Coleman et al., Investigation of Simulated annealing, ant-colony optimization, and genetic algorithms for self-structuring antennas, IEEE Transactions on Antennas and Propagation, vol. 52(4), p. 1007-1014, Apr. 2004.

* cited by examiner

SELF-STRUCTURING ANTENNA WITH ADDRESSABLE SWITCH CONTROLLER

FIELD OF THE INVENTION

This invention relates to a self-structuring antenna.

BACKGROUND OF THE INVENTION

Self-structuring antenna systems are already known. For instance, U.S. Pat. No. 6,175,723 B1 issued to Edward Joseph Rothwell, III, Jan. 16, 2001, discloses a self-structuring antenna system with a switchable antenna array. The antenna array comprises a plurality of antenna elements that are selectively electrically connectable to each other by a series of switch elements so that the physical shape of the antenna array can be altered. The antenna elements include wires, whereby the wires of adjacent antenna elements are connected by a mechanical or solid state switch element. One or more feed points are electrically connected to predetermined locations within the antenna array and to a receiver associated with the antenna array. A feed back signal from the receiver provides an indication of signal reception and antenna performance. The feed back signal is applied to a computer that selectively opens and closes the switch elements. An algorithm is used to program the computer so that the opening and closing of the switch elements attempts to achieve antenna optimization and performance.

A drawback of the self-structuring antenna systems disclosed in the Rothwell III '723 patent is the necessity of including several electric or optic cables to control the switch elements at the junctions of the antenna elements.

SUMMARY OF THE INVENTION

The invention provides a self-structuring antenna system that does not require several electric or optic cables to control switch elements at the junctions of the antenna elements.

In one preferred embodiment, the switch elements are operated by wireless communication to addressable switch controllers associated with the respective switch elements.

In another preferred embodiment, the switch elements are operated by communication via the antenna to addressable switch controllers associated with the respective switch elements.

DETAILED DESCRIPTION OF PREFERRED EMBODIMENTS

Figure 1:
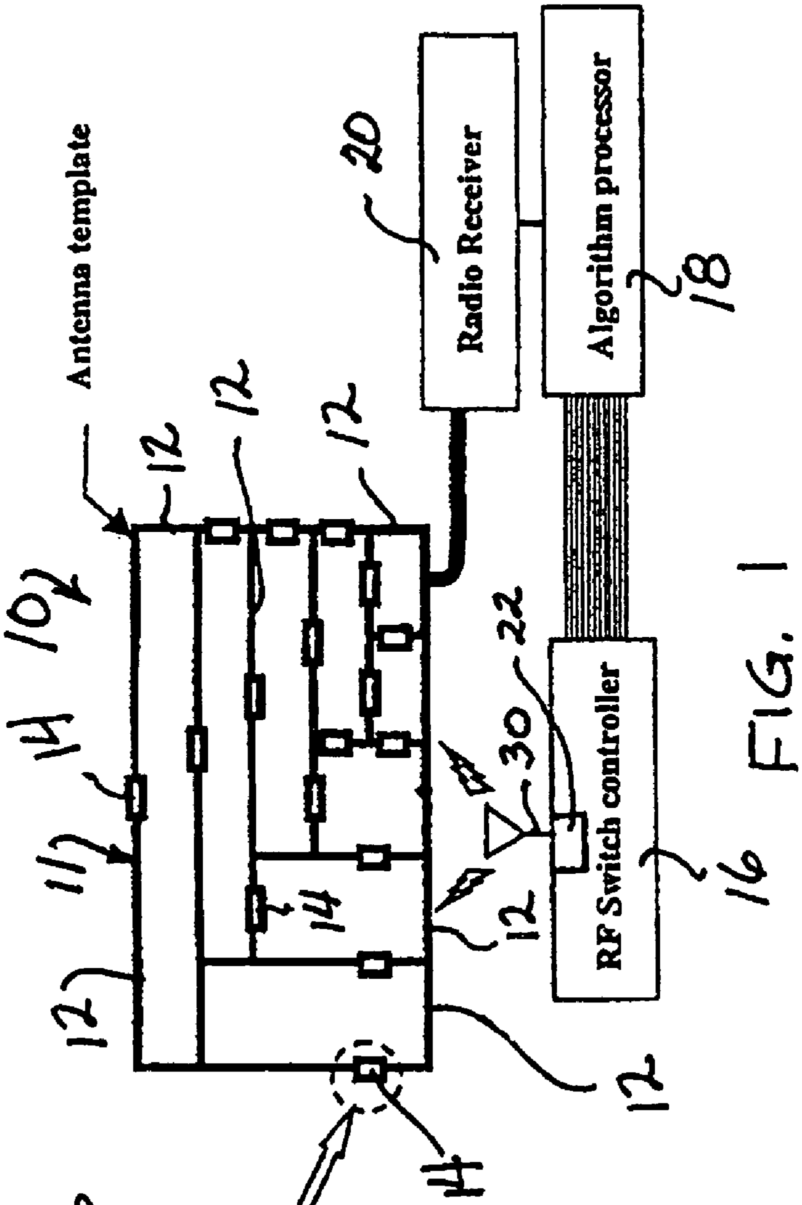
FIG. 1 is a schematic diagram of a self-structuring antenna system that embodies the invention.

Referring now to FIG. 1, a self-structuring antenna (SSA) system 10 comprises an antenna 11 having antenna elements 12 that are arranged with switch elements 14 in a pattern such as the pattern shown in FIG. 1. Switch elements 14 are controllable so as to be open or closed. Closing a particular switch element 14 establishes an electrical connection between the two adjacent antenna elements 12 associated with the particular switch element 14. On the other hand, opening a particular switch element 14 disconnects the electrical connection between the two adjacent antenna elements associated with the particular switch element 14. Consequently closing some switch element elements 14 and opening other switch element elements 14 results in an antenna of a particular shape or configuration. Selecting which switch element elements 14 are closed and which switch element elements 14 are opened enables the antenna system 10 to implement a wide variety of antenna shapes or configurations.

The self-structuring antenna system 10 further comprises a switch controller 16, a processor 18 and a receiver 20. Receiver 20 receives a radiated electromagnetic signal, for example, a radio frequency signal via antenna 11. Receiver 20 feeds the appropriate received signal information, for example, the receiver Automatic Gain Control (AGC) voltage level, to the processor 18 which uses an algorithm to determine appropriate configurations for antenna 11. Processor 18 then communicates the required control signals to switch controller 16 which opens or closes various ones of the switch elements 14 to form the antenna configurations as determine by the algorithm. This process continues until acceptable reception is achieved.

The self-structuring antenna system as thus far described is already known, more or less from U.S. Pat. No. 6,175,723 B1 entitled, "Self-structuring Antenna System with a Switchable Antenna Array and an Optimizing Controller" issued to Edward Joseph Rothwell, III, Jan. 16, 2001, and my co-pending U.S. Patent application Ser. No. 10/818,559 entitled "Self-Structuring Hybrid Antenna System" filed Apr. 5, 2004.

However, as pointed out above, particularly with regard to the Rothwell, III '723 patent, control of the switch elements 14 has been a long standing problem because of the need for several electric or optic cables leading from the switch controller 16 to each of the respective switch elements 14. The self-structuring antenna system 10 of the invention overcomes the multiple cable need problem by wireless communication incorporating a transmitter 22 in switch controller 16 and receivers associated with the respective switch elements in miniature wireless switch controller modules 24.

Figure 2:
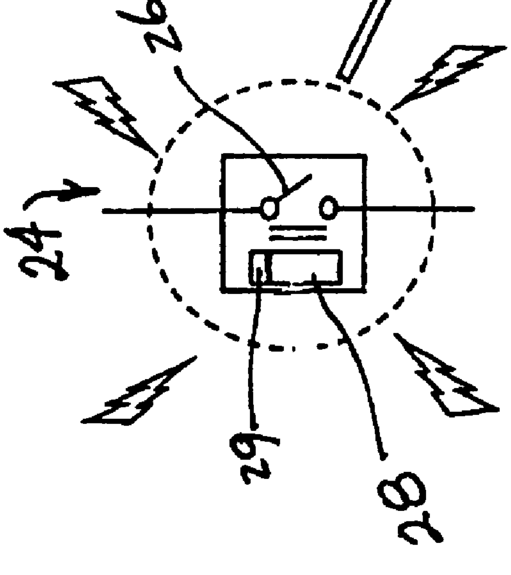
FIG. 2 is an enlargement of a portion of FIG. 1.

A typical wireless switch controller module 24 which replaces each switch element 14 is shown in FIG. 2. Switch controller module 24 comprises a switch element 26 and an addressable switch element controller 28 equipped with a receiver 29 for opening and closing its associated switch element 26. Thus the self-structuring antenna system 11 of the invention utilizes "wireless" connections from switch controller 16 to each of the addressable switch element controllers 28 for operating switch elements 26 in antenna 11.

The use of a transmitter 22 by switch controller 16 and the use of wireless switch controller modules 24 with addressable switch element controllers 28 and receivers 29 for operating switch elements 26 eliminates the need for the several cables of the prior art by using wireless communication techniques. One example of a possible wireless communication from switch element controller 16 to switch controller modules 24 is a "low data rate" radio frequency (RF) communication signal that is broadcast thru the air to the switch controller modules 24 by the local RF transmitter 22 in the switch controller 16 as indicated by antenna 30.

Switch modules 24 preferably contain electronics for module addressing purposes, switch element state changing capability, miniature energy storage devices and circuitry for converting the same or other independent RF signals into an energy form suitable for charging the miniature energy storage device. In this example of the invention, the frequency of operation could range from MHz to GHz, and be of low power. For example, the frequency of operation may be within the RF bands associated with Bluetooth, 802.11b, 802.11a, ZigBee, etc. Therefore, switch controller modules 24 can be self-contained "battery less" switch element modules that can be placed on various antenna elements while not requiring physical switch element control interconnections, such as control and/or power wires.

Switch modules 24 are preferably as small as possible, i.e. tiny, nano, or micro in size, to avoid any possibility of interfering with the operation of antenna 11. For example, (CMOS) switches are available in a die form package (1.2 mm×1.2 mm), (GaAs) switches are in a six-pin package (1.2 mm×1.2 mm), and (MEMS) switches in a six-pin package (3 mm×4 mm) with much smaller dimensions (0.1 mm×0.1 mm) in development.

Figure 3:
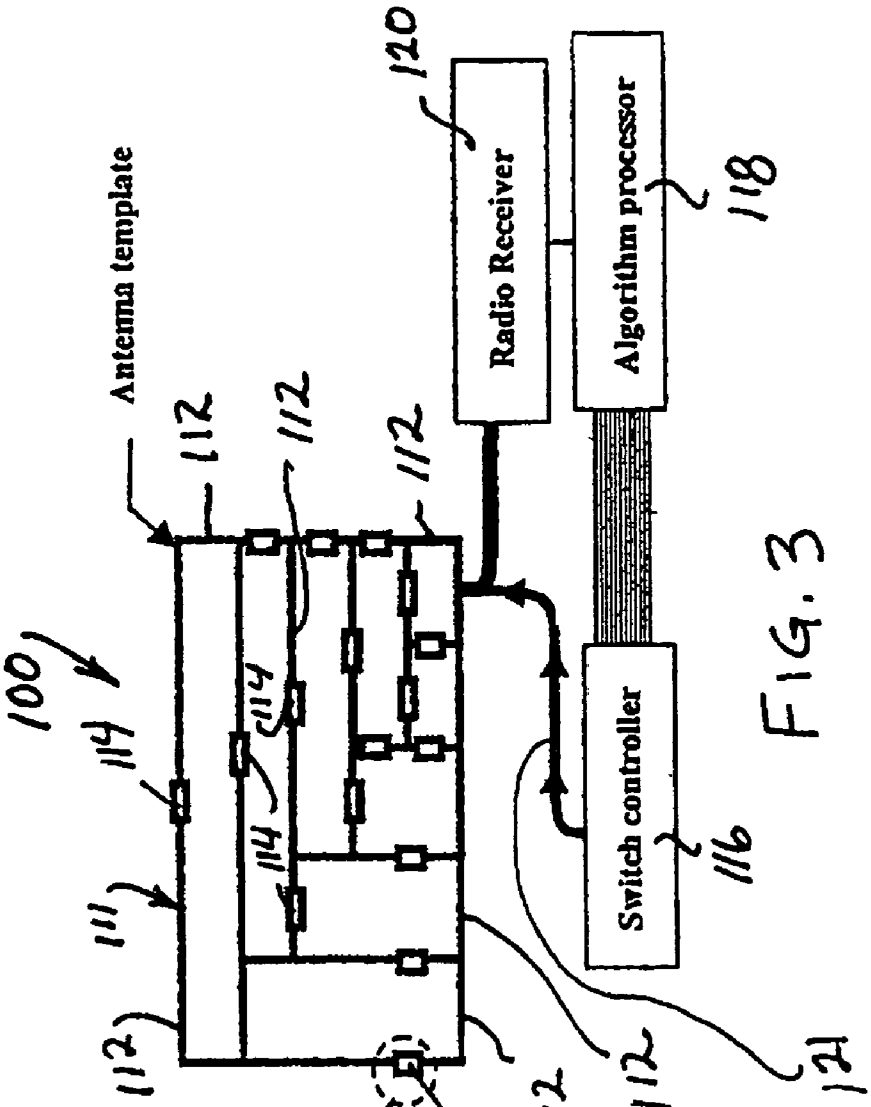
FIG. 3 is a schematic diagram of another self-structuring antenna system that embodies the invention.

Referring now to FIG. 3, another self-structuring antenna (SSA) system 100 of the invention comprises an antenna 111 having antenna elements 112 that are arranged with switch elements 114 in a pattern such as the pattern shown in FIG. 3. Switch elements 114 are controllable so as to be open or closed. Closing a particular switch element 114 establishes an electrical connection between the two antenna elements 112 associated with the particular switch element 114. On the other hand, opening a particular switch element 114 disconnects the electrical connection between the two antenna elements associated with the particular switch element 114. Consequently closing some switch elements 114 and opening other switch element elements 114 results in an antenna of a particular shape or configuration. Selecting which switch elements 114 are closed and which switch elements 114 are opened enables the antenna system 100 to implement a wide variety of antenna shapes or configurations.

The self-structuring antenna system 100 further comprises a switch controller 116, a processor 118 and a receiver 120. Receiver 120 receives a radiated electromagnetic signal, for example, a radio frequency signal via antenna 111. Receiver 120 feeds the appropriate received signal information, for example, the receiver Automatic Gain Control (AGC) voltage level, to the processor 118 which uses an algorithm to determine appropriate configurations for antenna 111. Processor 118 then communicates the required control signals to controller 116 which opens or closes various ones of the switch elements 114 to form the antenna configurations as determine by the algorithm. This process continues until acceptable reception is achieved.

The self-structuring antenna system 110 as thus far described is already known, more or less from U.S. Pat. No. 6,175,723 B1 entitled, "issued to Edward Joseph Rothwell, III, Jan. 16, 2001, and my co-pending U.S. patent application Ser. No. 10/818,559 entitled "Self-Structuring Hybrid Antenna System" filed Apr. 5, 2004.

However, as pointed out above, particularly with regard to the Rothwell, III '723 patent, control of the switch elements 114 has been a long standing problem because of the need for several electric or optic cables. The alternative self-structuring antenna system 100 of the invention overcomes the multiple cable need problem by coupling switch controller 116 to antenna 111 by a single conductor 121 and using antenna 111 to communicate with respective switch elements in a miniature switch controller module 124.

Figure 4:
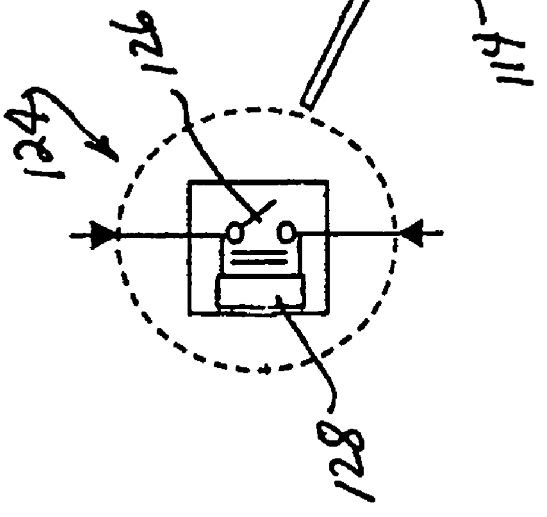
FIG. 4 is an enlargement of a portion of FIG. 3.

A typical switch controller module 124 is shown in FIG. 4. Switch controller module 124 comprises a switch element 126 and an addressable switch element controller 128 with a power converter circuit for opening and closing switch element 126. The power converter circuit acts like a low-pass frequency filter device that permits low frequency switch address signals (i.e., the signals are at frequencies below the AM band) to pass through it and communicate with all antenna switches. Thus the alternative self structuring antenna system of the invention utilizes wire connections from switch controller 116 to antenna 111, to each of the antenna elements 112, and each addressable switch controller 128. In addition, each addressable switch controller 128 is powered by an RF power converter circuit or a low frequency power converter circuit with the power need for the switch to opening and closing switch element 126.

The coupling of the switch controller 116 to the antenna 111 and the use of addressable switch controllers 128 in switch controller modules 124 for operating switch elements 126 eliminates the need for several electric or optic cables by using multiplexing communication techniques.

The "wireless" connection and communication techniques of the respective embodiments reduce weight by eliminating control cables and connectors, improve ease of installation by eliminating the control cable bundle and connectors, and increase reliability by reducing the number of cables and connectors. The use of a RF wireless battery charging system eliminates the need for a "wired-in" charging system or battery replacement. In addition, the ability to frequently use the RF charging technique allows the switch modules to use a much smaller energy storage device or battery.

Another possibility for the switch controller modules 24 or 124 is the use of miniature electromechanical system (MEMS) switch element modules that use low voltage power supply (e.g. 3-10 volts) with a charge pump to generate its required low power switching voltage (e.g., 70 volts). This same charge pump could be used with a RF wireless battery charging system to obtain this same low power switching voltage.

In other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:

1. A self-structuring antenna system comprising:

a plurality of antenna elements;

a plurality of independently addressable switch elements arranged with the antenna elements to, when selectively closed, electrically couple ones of the antenna elements to one another; and a switch controller for opening and closing the switch elements that is operatively associated with the plurality of switch elements through a single communication link interconnecting the switch controller to respective ones of the addressable switch elements.

2. The self-structring antenna system of claim 1 wherein the plurality of switch elements are operated by a plurality of addressable switch element controllers.

3. The self-structuring antenna system of claim 2 wherein the switch controller is operatively associated with the plurality of addressable switch element controllers by wireless communication through said single communication link.

4. The self-structuring antenna system of claim 2 wherein the switch controller is coupled to one of the antenna elements through said single communication link and communicates with the plurality of addressable switch element controllers via the antenna elements.

5. The self-structuring antenna system of claim 1 wherein the plurality of addressable switch element controllers are modules.

6. The self-structuring antenna system of claim 5 wherein the switch controller has a transmitter and each one of the plurality of addressable switch element controllers has an associated receiver.

7. The self-structuring antenna system of claim 6 including a plurality of switch modules containing the respective switch elements and the respective addressable switch controllers.

8. The self-structuring antenna system of claim 7 wherein the plurality of switch modules contain the respective associated receivers.

* * * * *